(12) United States Patent
Bancel (10) Patent No.: US 8,484,731 B2
(45) Date of Patent: Jul. 9, 2013

(54) METHOD FOR DETECTING AN ATTACK BY FAULT INJECTION INTO A MEMORY DEVICE, AND CORRESPONDING DETECTION SYSTEM

(75) Inventor: Frédéric Bancel, Senas (FR)

(73) Assignee: STMicroelectronics (Rousset) SAS, Rousset (FR)

(*) Notice: Subject to any disclaimer, the term of this patent is extended or adjusted under 35 U.S.C. 154(b) by 126 days.

(21) Appl. No.: 13/184,779

(22) Filed: Jul. 18, 2011

(65) Prior Publication Data

US 2012/0023580 A1    Jan. 26, 2012

(30) Foreign Application Priority Data

Jul. 21, 2010    (FR) .................................. 10 55928

(51) Int. Cl.
*G06F 21/00* (2006.01)

(52) U.S. Cl.
USPC ............................................ 726/22; 713/187

(58) Field of Classification Search
USPC ................. 726/22, 24; 713/187, 188
See application file for complete search history.

(56) References Cited

U.S. PATENT DOCUMENTS

| 2003/0106942 | A1 | 6/2003 | Ohya et al. ............... 235/492 |
| 2010/0077225 | A1* | 3/2010 | Salgado et al. ........... 713/189 |

OTHER PUBLICATIONS

Bar-El et al., "The sorcerer's apprentice guide to fault attacks", Software countermeasures, http://web.archive.org/web/20041016071838/eprint.iacr.org/2004/100, May 2004, pp. 1-13.
Tridell et al., "The rsync algorithm", http://samba.anu.edu.au/rsync/tech_report/tech_report.htm, May 2002, pp. 1-10.

* cited by examiner

*Primary Examiner* — Edward Zee
(74) *Attorney, Agent, or Firm* — Allen, Dyer, Doppelt, Milbrath & Gilchrist, P.A.

(57) ABSTRACT

The method for detecting an attack by fault injection into memory positions includes a generation of an initial value of a reference indication including an application of a reversible mathematical operator to the values of the information stored in the memory positions. An updating of the value of this reference indication is performed on each write in at least one memory position by using the operator, the reverse operator and the values of the stored information before and after each write in the at least one memory position. And, in the presence of a request, a check is performed as to whether a criterion involving the values of the information stored in the memory positions at the time of the request and the operator or its reverse is or is not satisfied by the value of the reference indication at the time of the request.

24 Claims, 7 Drawing Sheets

| Byte 1 | Byte 2 | Byte 3 | |
|---|---|---|---|
| 03 | 00 | A2 | Initial value of the reference indication<br>03 + 00 + A2 = A5 |
| 03⇒66 | | | Write, update of the reference indication<br>First update A5 − 03 = A2<br>Second update A2 + 66 = 108 |
| | 00 ⇒ 12 | | Write, update of the reference indication<br>First update 108 − 00 = 108<br>Second update 108 + 12 = 11A |
| 66 | 12 | A2 | Check request<br>11A − 66 − 12 − A2 = ? 0, yes OK |

| Byte 1 | Byte 2 | Byte 3 | |
|---|---|---|---|
| 03 | 00 | A2 | Initial value of the reference indication<br>03 + 00 + A2 = A5 |
| 03⇒43 | | | Injection of faults into byte 1 |
| 43 ⇒ 66 | | | Write, update of the reference indication<br>First update A5 − 43 = 62<br>Second update 62 + 66 = C8 |
| | 00 ⇒ 12 | | Write, update of the reference indication<br>First update C8 − 00 = C8<br>Second update C8 + 12 = DA |
| 66 | 12 | A2 | Check request<br>DA − 66 − 12 − A2 = ? 0, no alert |

METHOD FOR DETECTING AN ATTACK BY FAULT INJECTION INTO A MEMORY DEVICE, AND CORRESPONDING DETECTION SYSTEM

FIELD OF THE INVENTION

The present disclosure relates, generally, to electronic circuits, and more particularly to the detection of an attack by fault injection into a memory device. The present disclosure applies, advantageously but in a non-limiting way, to chip cards and to the protection of the confidential data that they contain.

BACKGROUND OF THE INVENTION

Among the possible attacks performed by hackers to extract confidential data from a memory, for example; a protected memory of a chip card, there are the attacks said to be by fault injection (DFA or "Differential Fault Analysis") which are designed to disrupt the operation and/or the content of the memory, for example; via a radiation (laser, infrared, X-rays, etc.). It is therefore particularly useful to be able to detect such an attack by fault injection. Once the attack is detected, there are numerous approaches depending on the application for either blocking the component, or preventing the sensitive data from being read, or resetting the component.

For the conventional memory architectures, for example, those of the bit-by-bit type in which each bit stored can be read individually, there is a possibility of detecting such an attack based on a check on the parity of the bits read during a read operation.

However, such approaches may not make it possible, in certain cases, to detect an attack by fault injection when such an attack has actually taken place.

SUMMARY OF THE INVENTION

According to one implementation and embodiment, there is proposed a method for detecting an attack by fault injection on a memory device and a corresponding memory device, offering a more reliable detection of an attack by fault injection, while making it possible to test a very large number of memory positions at a low cost.

According to one aspect, there is proposed a method for detecting an attack by fault injection into memory positions comprising: a generation of an initial value of a reference indication comprising an application of a reversible mathematical operator to the values of the information stored in the memory positions, and an updating of the value of this reference indication on each write in at least one memory position by using the operator. The reverse operator and the values of the information are stored in the at least one memory position before and after each write in the at least one memory position. And in the presence of a request, the method includes checking whether a criterion involving the values of the information stored in the memory positions at the time of the request and the operator or its reverse is or is not satisfied by the value of the reference indication at the time of the request.

The updating of the reference indication may be performed only at the time of a legitimate write in at least one memory position while the values of the contents of the memory positions are changed also at the time of fault injection. Thus, the fact that a criterion involving values of the contents of the memory is satisfied by the reference indication makes it possible to reveal the presence of fault injection.

Moreover, the same reference indication may be used for all the memory positions which makes it possible to test a very large number of memory positions with a single reference. Thus, according to this aspect, a reference is constructed throughout the method, and the check as to whether the criterion is satisfied may take into account all the modifications (updates, faults injected) of the contents of the memory positions by the use of the operator and the reverse operator. There is therefore no loss of information nor compression of the data.

Moreover, the request, in the presence of which the detection of a possible fault injection is performed, can be defined in advance by the application implemented in a processor, for example, a processor of a chip card incorporating a protected memory containing the memory positions, or else by the user when the chip card is being customized, or else be emitted cyclically or pseudo-randomly by a pseudo-random generator. Because of this, the latency on the detection depends only on the definition of the instances of occurrence of the requests.

According to one implementation, the updating step comprises: a) a first update of the reference indication comprising an application of the reverse operator to the preceding value of the reference indication and to the values of the information stored in the at least one memory position before the write operation in the at least one memory position; and b) a second update of the reference indication comprising the application of the operator to the value of the reference indication updated in the step a) and to the values of the information stored in the at least one memory position after the write operation in the at least one memory position.

These two updates, taking into account both values preceding the write operation and values after the write operation, make it possible to detect a fault injection even when the latter has been overwritten by a legitimate value.

According to one variant, the criterion comprises an application of the operator to the values of the information stored in all the memory positions at the time of the request. This application of the operator provides a value that is called "additional value". Then, this additional value is compared with the value of the reference indication at the time of the request, and the criterion is declared not satisfied, corresponding to the detection of an attack by fault injection, if the additional value is different from the value of the reference indication at the time of the request.

According to another variant, the criterion comprises an application of the reverse operator to the value of the reference indication at the time of the request and to the values of the information stored at the time of the request so as to obtain an additional value. Then a comparison of this additional value with the neutral element of the operator and the criterion is declared not satisfied, corresponding to the detection of an attack by fault injection, if the additional value is different from the neutral element. The neutral element is the zero value when the operator is addition and the reverse operator is subtraction. Satisfaction of the criterion is simple to test since it involves a simple comparison of two values, one of which may be the neutral element.

According to one implementation, the operator is an associative and commutative operator, for example addition. That said, other operators are possible, such as, for example, multiplication and division. Thus, it is possible to use very simple operators requiring low computation consumption.

According to one implementation, when the check as to whether the criterion is satisfied is concomitant with a requested write operation, a check is carried out as to whether the criterion is satisfied after the writing and the corresponding updating of the reference indication.

As a variant, when the check as to whether the criterion is satisfied is concomitant with a requested write operation, the write operation that is performed after the check as to whether or not the criterion is satisfied is suspended. It is thus possible to produce criterion satisfaction requests at any moment without worrying about the fact that they are concomitant with a write operation.

According to another aspect, there is proposed a detection system for detecting an attack by fault injection in protected memory positions comprising: a generator or generation means configured to generate an initial value of a reference indication comprising an application of a reversible mathematical operator to the values of the information stored in the memory positions; an updating or updating means configured to update the value of this reference indication on each write in at least one memory position by using the operator, the reverse operator and the values of the information stored in the at least one memory position before and after each write in the at least one memory position; and a checker or checking means configured to, in the presence of a request, check as to whether a criterion involving at least the values of the information stored in the memory positions at the time of the request and the operator or its reverse is or is not satisfied by the value of the reference indication at the time of the request.

According to one embodiment, the updating means are configured to: a) perform a first update of the reference indication comprising an application of the reverse operator to the preceding value of the reference indication and to the values of the information stored in the at least one memory position before the write operation in the at least one memory position; and perform a second update of the reference indication comprising the application of the operator to the value of the reference indication updated in the step a) and to the values of the information stored in the at least one memory position after the write operation in the at least one memory position.

According to one embodiment, the checking means are configured to apply the operator to the values of the information stored in all the memory positions at the time of the request so as to obtain an additional value, then to compare this additional value with the value of the reference indication at the time of the request. If the criterion is not satisfied, that is to say, if the additional value is different from the value of the reference indication at the time of the request, the checking means are configured to deliver an indication representative of an attack by fault injection.

According to one embodiment, the checking means are configured to apply the reverse operator to the value of the reference indication at the time of the request and to the values of the information stored in all the memory positions at the time of the request so as to obtain an additional value, then to compare this additional value with the neutral element of the operator. And if the criterion is not satisfied, that is to say, if the additional value is different from the neutral element for the operator, the checking means are configured to deliver an indication representative of an attack by fault injection.

According to one embodiment, the system comprises a controller or control means configured to defer the check as to whether the criterion is satisfied after a write operation and the updating of the reference indication when the check as to whether the criterion is satisfied is concomitant with a write operation.

According to one embodiment, the system comprises a controller or control means configured to suspend the write operation and to defer the write operation and the updating of the reference indication after the check as to whether or not the criterion is satisfied, when the check as to whether the criterion is satisfied is concomitant with a write operation.

According to another aspect, there is proposed an integrated circuit incorporating the detection system as defined hereinabove.

According to yet another aspect, there is proposed a chip card comprising an integrated circuit as defined hereinabove.

BRIEF DESCRIPTION OF THE DRAWINGS

Other features and advantages of the present disclosure will become apparent from studying the detailed description of non-limiting implementations and embodiments, and the appended drawings in which.

DETAILED DESCRIPTION OF THE PREFERRED EMBODIMENTS

Figure 1:
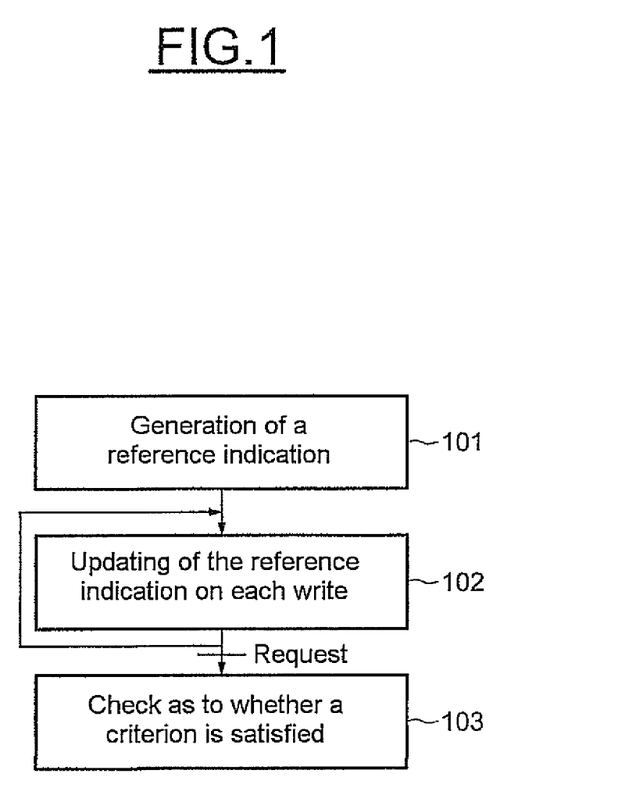
FIGS. 1, 2 and 3 are flow charts to schematically illustrate implementations of the fault injection detection method according to the present embodiments.
Figure 2:
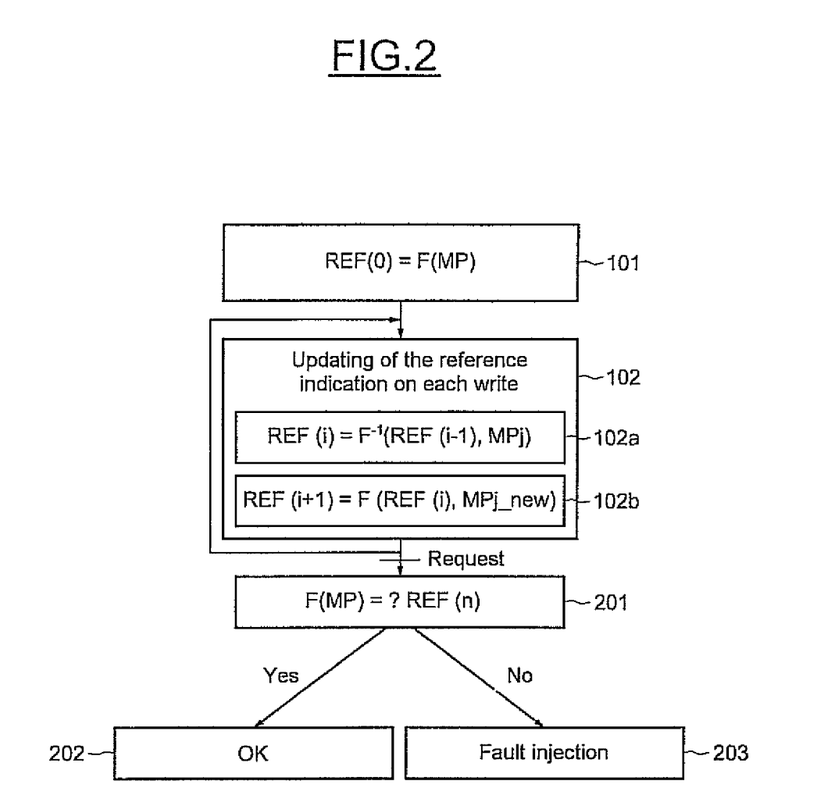

FIG. 1 schematically shows the main steps of one implementation of a method for detecting fault injection in a memory, for example a chip card memory. Firstly, an initial value of a reference indication REF (0) is generated (step 101). This generation is performed here by applying an operator F to the values of all the contents of the protected memory positions MP (FIG. 2). The operator F is an operator that associates a number that is, for example, hexadecimal with two or more numbers that are, for example, hexadecimal. This operator F is associative, commutative and also reversible.

The operator $F^{-1}$ is defined as the reverse of the operator F. As an example of embodiment, the reverse operator $F^{-1}$ is an operator which, when applied to two identical numbers, delivers the neutral element of the operator F. As is known to those skilled in the art, the neutral element for the operator F is such that the operator applied to an initial number and to the neutral element gives the initial number for the result. As an example of embodiment, the operator F and the operator $F^{-1}$ are respectively addition and subtraction or even, multiplication and division. The value 0 is the neutral element for the addition and the value 1 is the neutral element for the multiplication.

Hereinafter in the description, the cases of addition and subtraction will be particularly illustrated, but, that said, the present disclosure may be implemented with any reversible operator F. In the case of the application of the operator to a number of values greater than 2, the operator F or $F^{-1}$ is applied to the first pair out of the values then to the next pair comprising the result of the operator applied to the first pair and the next value and so on.

Referring once again to FIG. 1, it can be seen that, on each write in at least one protected position, the reference indication REF (0) is updated (step 102). Finally, when a check request is emitted, the check as to whether a criterion is satisfied is carried out (step 103). This check involves the values of the protected memory positions of the memory MEM and the updated reference indication.

FIG. 2 illustrates more precisely the steps of FIG. 1. The first step 101 corresponds, as indicated previously, to the application to all the memory positions MP of the operator F so as to obtain an initial value of the reference indication REF (0). The step for updating of the reference indication (step 102) comprises two sub steps: a first updating step (step 102a) which involves the value before writing of the position or positions in which values may be written. During this step, the operator $F^{-1}$ is applied to the preceding reference value REF (i−1) and to the old values of at least one memory position MPj in which it may be written to obtain the current reference value REF (i); and a second updating step (step 102b) which involves the value written in the position or positions. During this step, the operator F is applied to the reference value REF (i) and to the new values of at least one memory position MPj_new in which it is written, to obtain a new reference value REF (i+1).

FIG. 2 also illustrates a variant of the step for checking as to whether a criterion is satisfied. In the presence of a request, during the step 201, the operator F is applied to all the values of the memory positions in order to obtain an additional value VS. This value VS is then compared with the last reference value REF (n). If the criterion is satisfied, then the method detects no fault injection (202). If the criterion is not satisfied, the method detects a fault injection (203).

Figure 3:
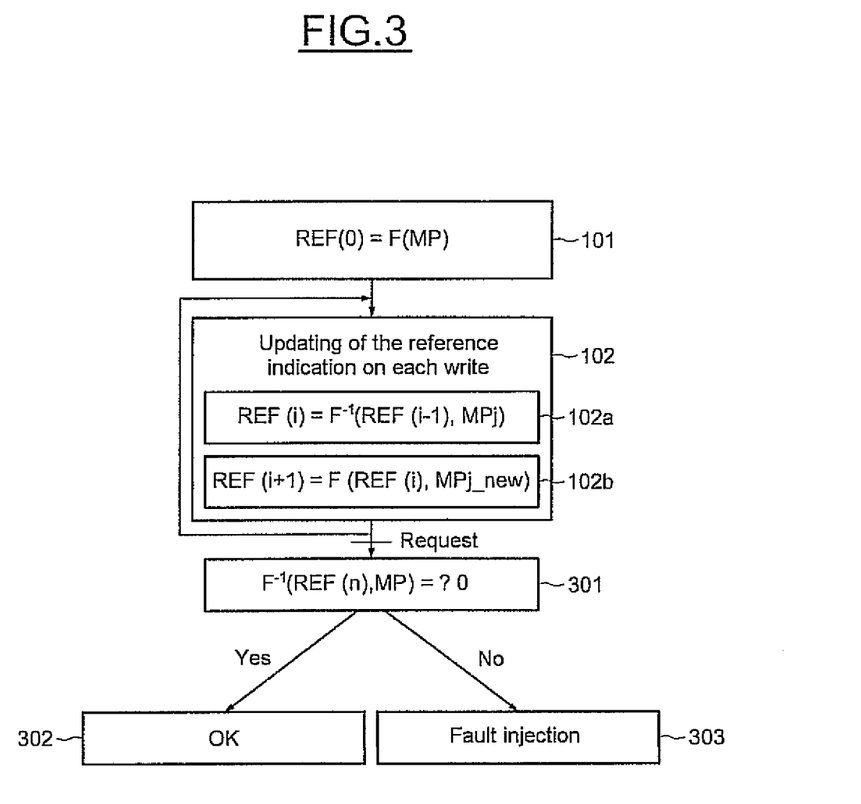

FIG. 3 illustrates another variant of the step for checking as to whether a criterion is satisfied. According to this variant, during the step 301, the reverse operator $F^{-1}$ is applied to the reference indication and to all the values of the memory positions in order to obtain an additional value VS. This value VS is then compared with the neutral element.

Figure 4:
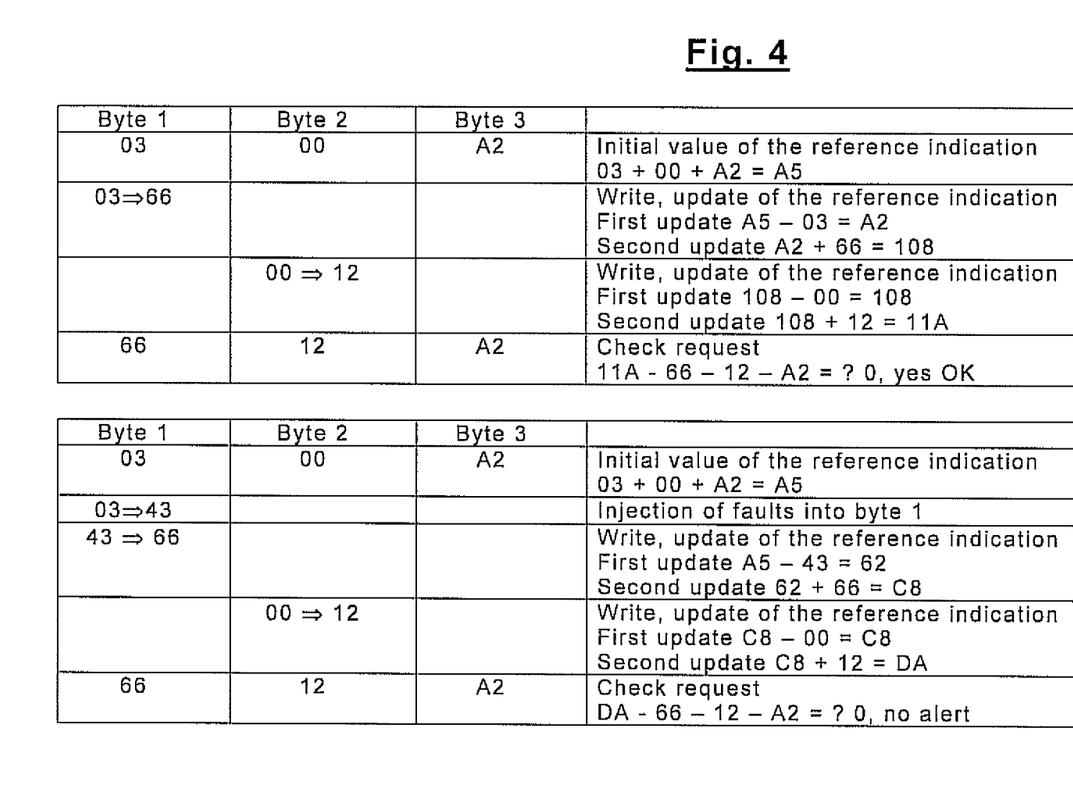
FIG. 4 is a chart to illustrate an exemplary implementation of the method.

FIG. 4 illustrates an exemplary implementation of the method that uses addition as the operator and subtraction as the reverse operator, in the case of a three-byte memory containing hexadecimal numbers. Two tables are shown corresponding to two different cases; in the first table, there is no fault injection, in the second table, there is a fault injection which may be detected. Each of the tables comprises four columns, the first three columns correspond to the values in each of the three bytes of the memory and the fourth column illustrates how the steps previously illustrated are carried out over the three bytes.

In the first table, on the first line, the values of the three bytes are 03, 00, A2 at the moment when the reference indication is generated. This generation step (step 101, FIG. 2) is performed by adding each of the values of all the protected positions of the memory, that is to say all the values of the three bytes: 03+00+A2=A5.

Then the second line corresponds to a write event in byte 1. During this write, the preceding value of the byte "03" is changed by the new value, "66". During the first updating step (step 102a), the reference indication has subtracted from it the value that may be replaced and the reference indication becomes: "A5−03=A2". During the second updating step (step 102b), the updated reference indication has added to it the value that may be written and the reference indication becomes: "A2+A66=108".

A new write event, this time in byte 2, corresponds to the third line. During this write, the preceding value of the byte "00" is changed by the new value, "12". During the first updating step (step 102a), the reference indication has subtracted from it the value that may be replaced and the reference indication becomes: "108−00=108". During the second updating step (step 102b), the updated reference indication has added to it the value that may be written and the reference indication becomes: "108+12=11A".

The step 103 (FIG. 1) corresponds to the fourth line of the first table. During this step, the reference indication "1A" has subtracted from it all the values of the protected positions "11A−66−12−A2", the result of this operation is indeed zero or the neutral element for the addition. It can be deduced therefrom that there has been no fault injection.

The lines of the second table are similar. Line 1 corresponds to the calculation of the initial value of the reference indication with the three bytes, "03+00+A2=A5". Line 2 corresponds to a fault injection in byte 1. Thus, the value changes. It changes from "03" to "43", but this change is not taken into account for the updating of the reference indication because there is no write instruction. Line 3 corresponds to the updating of the reference indication with a write in the first byte. During this write, the preceding value of the byte "43" is changed by the new value, "66". During the first updating step (step 102a), the reference indication has subtracted from it the value that may be replaced and the reference indication becomes: "A5−43=62". During the second updating step (step 102b), the updated reference indication has added to it the value that may be written and the reference indication becomes: "62+66=C8". Line 4 corresponds to a new write event, this time in byte 2. During this write, the preceding value of the byte "00" is changed by the new value, "12". During the first updating step (step 102a), the reference indication has subtracted from it the value that may be replaced and the reference indication becomes: "C8−00=C8". During the second updating step (step 102b), the updated reference indication has added to it the value that may be written and the reference indication becomes: "C8+12=DA". Line 5 corresponds to the step 103 (FIG. 1). During this step, the reference indication "DA" has subtracted from it all the values of the protected positions "DA−66−12−A2", the result of this operation is not zero, and it can be deduced therefrom that there has been fault injection. With this example, it is shown that, despite a regular write in the byte in which a fault has previously been injected, the fault injection is detected.

Figure 5:
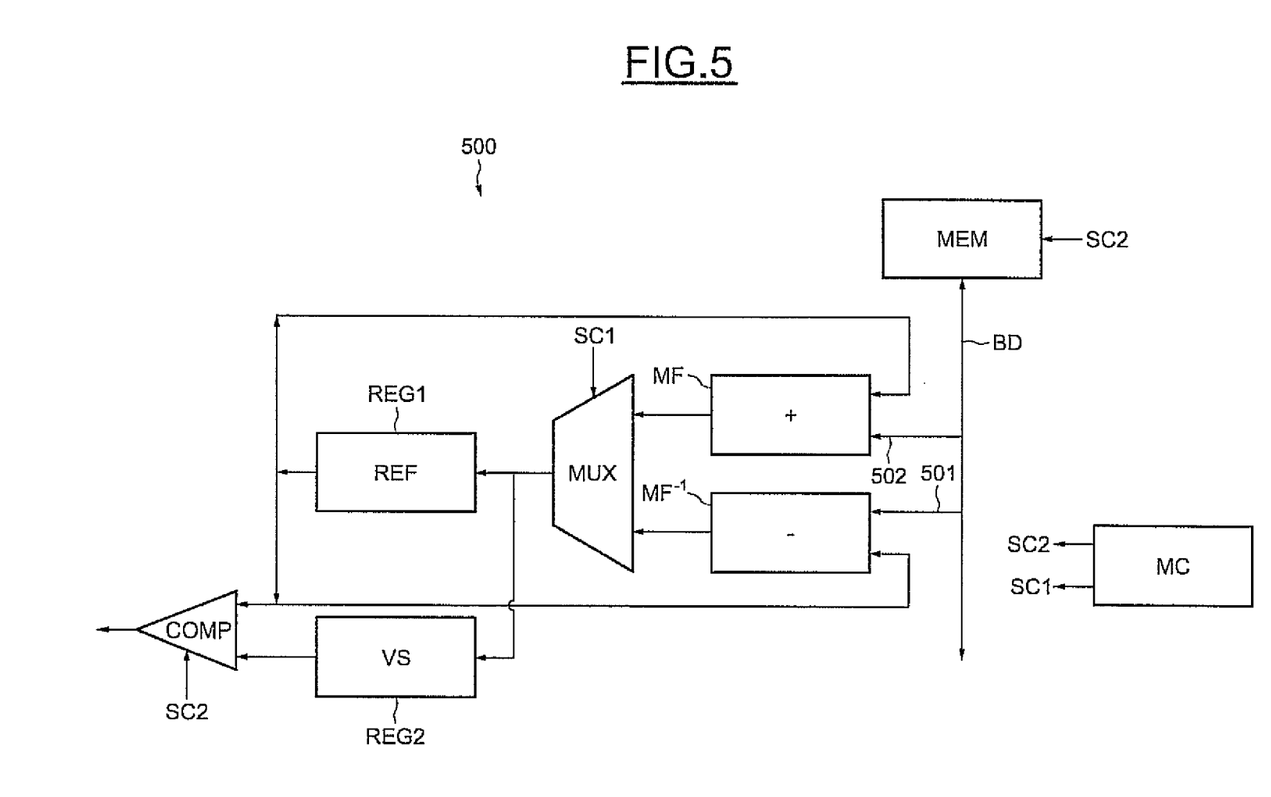
FIGS. 5, 6, 7 and 8 are schematic diagrams illustrating exemplary embodiments of the detection system according to the present disclosure.

FIG. 5 illustrates the architecture of a system according to the variant whose method is illustrated in FIG. 2. The detection system 500 is linked to a memory MEM whose positions are protected. The detection system comprises blocks or means MF, $MF^{-1}$, MUX and RG1 configured to perform the calculation of the initial reference indication REF (0) and to proceed with its updating by virtue of the controller or control means MC.

More specifically, during the step 101, the operator MF (here, an adder) is applied to all the values of the memory positions. For this, it accesses the memory positions via, for example, the branch connection 502 and the bus BD. During the step 102a, the operator $MF^{-1}$ (here, a subtractor) is applied to the reference value REF stored in the register RG1 and to the values MPj of the positions in which it may be written. For this, the operator $MF^{-1}$ accesses the memory positions via, for example, the branch connection 501 and the bus BD. During the step 102b, the operator MF is applied to the new reference value stored in the register RG1 and to the new values MPj_new of the positions in which it may be written. For this, the operator MF accesses this information by connecting via the branch connection 502 to the bus BD. The controller or control means MC make it possible, via the information SC1, to activate the input of the multiplexer that is appropriate to each updating step.

FIG. 5 also illustrates a comparator or comparison means COMP and a register RG2 which make it possible to test, in the presence of a request, whether a criterion is satisfied by the values of the memory positions and the reference stored in the register RG1. More specifically, during the emission of a request, under the control of the control means MC, the operator MF is applied to all the values of the memory positions to obtain an additional value VS which is stored in the register RG2. Then, this value is compared with the reference value stored in the register RG1 at the time of the request.

The control means MC are also used when a write operation is concomitant with a check request. In this case, they can: according to a first alternative, defer checking as to whether the criterion is satisfied after the reference indication has been written and updated (the comparator CMP is disabled by the signal SC2); and according to a second alternative, the control means MC can use the signal SC2 to defer the write operation in the memory MEM and the updating of the reference indication after the check as to whether or not the criterion is satisfied.

Figure 6:
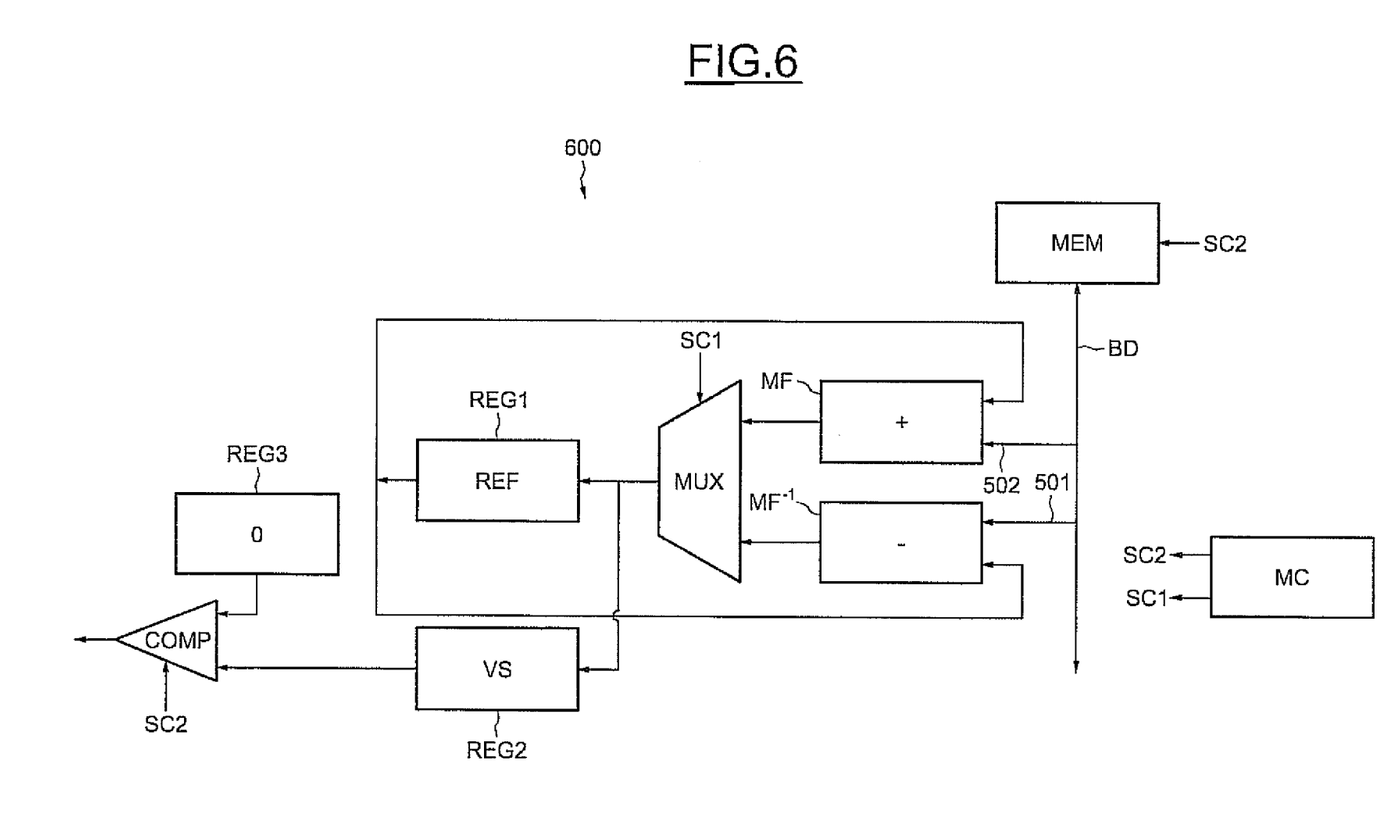

FIG. 6 also illustrates blocks or means identical to those already cited, comparison means COMP, RG2 and RG3 according to the variant whose method is illustrated in FIG. 3. More specifically, at the time of the emission of a request, under the control of the control means MC, the operator $MF^{-1}$ is applied to the value REF stored in RG1 and to all the values of the memory positions to obtain an additional value VS which is stored in the register RG2.

Then, this value is compared with the value of the neutral element (O for the addition) stored in the register RG3. The register RG2 is optional in the case where, after the request, there is no longer any need to update the reference REF. Such is the case, for example, when a single request is emitted at the end of the write operations in the memory. In this case, the additional value VS is stored in the register RG1 to be compared with the neutral element. As an exemplary embodiment, the controller or control means MC are implemented in a processor.

Figure 7:
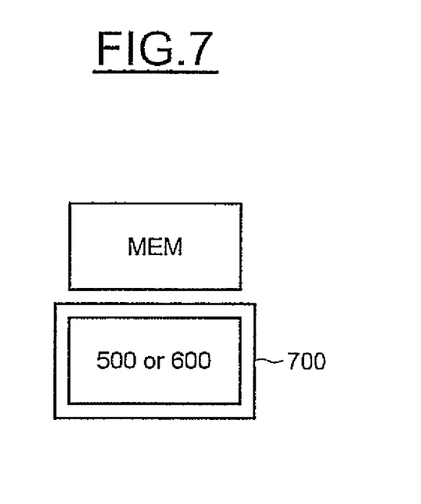
Figure 8:
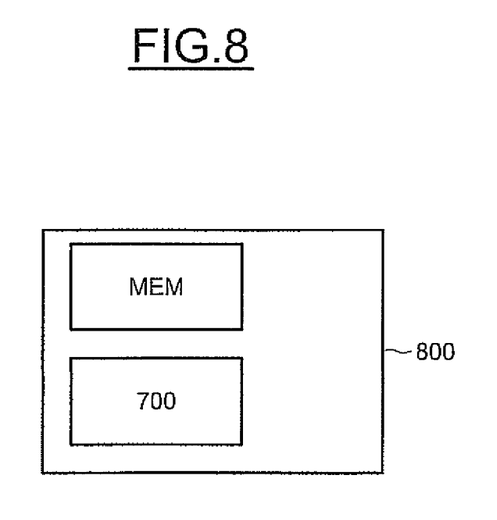

FIG. 7 illustrates an exemplary electronic circuit 700 comprising a detection system 500 or 600. FIG. 8 illustrates an exemplary chip card 800 having a memory with protected positions MEM and incorporating the electronic circuit 700.

That which is claimed is:

1. A method for detecting an attack by fault injection into memory positions comprising:
   generating an initial value of a reference indication comprising an application of a mathematical operator to values stored in the memory positions;
   updating the value of the reference indication on each write in at least one memory position by using the mathematical operator, a reverse mathematical operator and the values of the information stored in the at least one memory position before and after each write in the at least one memory position; and
   in presence of a request, checking as to whether a criterion involving the values stored in the memory positions at the time of the request and at least one of the mathematical operator and reverse mathematical operator is or is not satisfied by the value of the reference indication at the time of the request.

2. The method according to claim 1 wherein the updating comprises:
   a first updating of the reference indication comprising an application of the reverse mathematical operator to a preceding value of the reference indication and to the values of the information stored before the write operation in the at least one memory position; and
   a second updating of the reference indication comprising the application of the mathematical operator to the value of the reference indication updated in the first update and to the values of the information stored in the at least one memory position after the write operation in the at least one memory position.

3. The method according to claim 1, wherein the criterion comprises an application of the mathematical operator to the values stored in all the memory positions at the time of the request so as to obtain an additional value, then a comparison of this additional value with the value of the reference indication at the time of the request, and the criterion is declared not satisfied, corresponding to the detection of an attack by fault injection, if the additional value is different from the value of the reference indication at the time of the request.

4. The method according to claim 1, wherein the criterion comprises an application of the reverse mathematical operator to the value of the reference indication at the time of the request and to the values stored in all the memory positions at the time of the request so as to obtain an additional value, then a comparison of the additional value with the neutral element of the mathematical operator and the criterion is declared not satisfied, corresponding to the detection of an attack by fault injection, if the additional value is different from the neutral element for the mathematical operator.

5. The method according to claim 1, wherein the mathematical operator is an associative and commutative mathematical operator.

6. The method according to claim 1, wherein the mathematical operator is addition and the reverse mathematical operator is subtraction.

7. The method according to claim 1, wherein when the checking as to whether the criterion is satisfied is concomitant with a write operation, a checking is carried out as to whether the criterion is satisfied after the writing and the updating of the reference indication.

8. The method according to claim 1, wherein when the checking as to whether the criterion is satisfied is concomitant with a write operation, the write operation that is performed after the checking as to whether or not the criterion is satisfied is suspended.

9. A detection system for detecting an attack by fault injection in protected memory positions comprising:
   a generation element configured to generate an initial value of a reference indication comprising an application of a mathematical operator to values stored in the protected memory positions;
   an updating element configured to update the value of the reference indication on each write in at least one memory position by using the mathematical operator, a reverse mathematical operator and the values stored in the at least one memory position before and after each write in the at least one memory position; and
   a checking element configured to, in the presence of a request, check as to whether a criterion involving the values stored in the memory positions at the time of the request and at least one of the mathematical operator and the reverse mathematical operator is or is not satisfied by the value of the reference indication at the time of the request.

10. The detection system according to claim 9, wherein the updating element is further configured to:
    perform a first update of the reference indication comprising an application of the reverse mathematical operator to the preceding value of the reference indication and to the values stored in the at least one memory position before the write operation in the at least one memory position; and
    perform a second update of the reference indication comprising the application of the mathematical operator to the value of the reference indication updated in the first update and to the values in the at least one memory position after the write operation in the at least one memory position.

11. The detection system according to claim 9, wherein the checking element is further configured to apply the mathematical operator to the values of the information stored in all the memory positions at the time of the request so as to obtain an additional value, then to compare the additional value with the value of the reference indication at the time of the request, and if the additional value is different from the value of the reference indication at the time of the request, the checking block is configured to deliver an indication representative of an attack by fault injection.

12. The detection system according to claim 9, wherein the checking element is further configured to apply the reverse mathematical operator to the value of the reference indication at the time of the request and to the values of the information stored in all the memory positions at the time of the request so as to obtain an additional value, then to compare the additional value with the neutral element of the operator, and if the additional value is different from the neutral element for the operator, the checking element is configured to deliver an indication representative of an attack by fault injection.

13. The detection system according to claim 9, wherein the mathematical operator is an associative and commutative mathematical operator.

14. The detection system according to claim 9, wherein the mathematical operator is addition and the reverse mathematical operator is subtraction.

15. The detection system according to claim 9, further comprising a controller configured to defer the check as to whether the criterion is satisfied after a write operation and the updating of the reference indication when the check as to whether the criterion is satisfied is concomitant with a write operation.

16. The detection system according to claim 9, further comprising a controller configured to suspend the write operation and to defer the write operation and the updating of the reference indication after the check as to whether or not the criterion is satisfied, when the check as to whether the criterion is satisfied is concomitant with a write operation.

17. An integrated circuit for detecting an attack by fault injection in protected memory positions, and comprising:
a detection system including
a generation element configured to generate an initial value of a reference indication comprising an application of a mathematical operator to values stored in the protected memory positions,
an updating element configured to update the value of the reference indication on each write in at least one memory position by using the mathematical operator, a reverse mathematical operator and the values stored in the at least one memory position before and after each write in the at least one memory position, and
a checking element configured to, in the presence of a request, check as to whether a criterion involving the values stored in the memory positions at the time of the request and at least one of the mathematical operator and the reverse mathematical operator is or is not satisfied by the value of the reference indication at the time of the request.

18. The integrated circuit according to claim 17, wherein the updating element is further configured to:
perform a first update of the reference indication comprising an application of the reverse mathematical operator to the preceding value of the reference indication and to the values stored in the at least one memory position before the write operation in the at least one memory position; and
perform a second update of the reference indication comprising the application of the mathematical operator to the value of the reference indication updated in the first update and to the values in the at least one memory position after the write operation in the at least one memory position.

19. The integrated circuit according to claim 17, wherein the checking element is further configured to apply the mathematical operator to the values of the information stored in all the memory positions at the time of the request so as to obtain an additional value, then to compare the additional value with the value of the reference indication at the time of the request, and if the additional value is different from the value of the reference indication at the time of the request, the checking block is configured to deliver an indication representative of an attack by fault injection.

20. The integrated circuit according to claim 17, wherein the checking element is further configured to apply the reverse mathematical operator to the value of the reference indication at the time of the request and to the values of the information stored in all the memory positions at the time of the request so as to obtain an additional value, then to compare the additional value with the neutral element of the mathematical operator, and if the additional value is different from the neutral element for the operator, the checking block is configured to deliver an indication representative of an attack by fault injection.

21. A smart card comprising an integrated circuit for detecting an attack by fault injection in protected memory positions, the integrated circuit comprising:
a detection system including
a generation element configured to generate an initial value of a reference indication comprising an application of a mathematical operator to values stored in the protected memory positions,
an updating element configured to update the value of the reference indication on each write in at least one memory position by using the mathematical operator, a reverse mathematical operator and the values stored in the at least one memory position before and after each write in the at least one memory position, and
a checking block configured to, in the presence of a request, check as to whether a criterion involving the values stored in the memory positions at the time of the request and at least one of the mathematical operator and the reverse mathematical operator is or is not satisfied by the value of the reference indication at the time of the request.

22. The smart card according to claim 21, wherein the updating element of the detection system is further configured to:
perform a first update of the reference indication comprising an application of the reverse mathematical operator to the preceding value of the reference indication and to the values stored in the at least one memory position before the write operation in the at least one memory position; and
perform a second update of the reference indication comprising the application of the mathematical operator to the value of the reference indication updated in the first update and to the values in the at least one memory position after the write operation in the at least one memory position.

23. The smart card according to claim 21, wherein the checking element of the detection system is further configured to apply the mathematical operator to the values of the information stored in all the memory positions at the time of the request so as to obtain an additional value, then to compare the additional value with the value of the reference indication at the time of the request, and if the additional value is different from the value of the reference indication at the time of the request, the checking element is configured to deliver an indication representative of an attack by fault injection.

24. The smart card according to claim 21, wherein the checking element of the detection system is further configured to apply the reverse mathematical operator to the value of the reference indication at the time of the request and to the values of the information stored in all the memory positions at the time of the request so as to obtain an additional value, then to compare the additional value with the neutral element of the mathematical operator, and if the additional value is different from the neutral element for the operator, the checking block is configured to deliver an indication representative of an attack by fault injection.

* * * * *